United States Patent [19]
Luehr

[11] Patent Number: 6,132,602
[45] Date of Patent: Oct. 17, 2000

[54] CLARIFICATION PLANT FOR WATER PURIFICATION

[76] Inventor: Wolfgang Luehr, Swinemuender Strasse 49, D-13355 Berlin, Germany

[21] Appl. No.: 09/180,474
[22] PCT Filed: May 13, 1997
[86] PCT No.: PCT/DE97/01010
§ 371 Date: Nov. 10, 1998
§ 102(e) Date: Nov. 10, 1998
[87] PCT Pub. No.: WO97/43220
PCT Pub. Date: Nov. 20, 1997

[30] Foreign Application Priority Data

May 14, 1996 [DE] Germany .................. 196 21 156

[51] Int. Cl.⁷ .................................................. B01D 33/70
[52] U.S. Cl. .................. 210/150; 210/121; 210/167; 210/207; 210/248; 210/256; 210/519; 210/521
[58] Field of Search .................. 210/121, 150, 210/167, 205, 207, 248, 256, 519, 521

[56] References Cited

U.S. PATENT DOCUMENTS 3,878,097  4/1975  Mochizuki et al. .
4,231,863  11/1980  Sutphin .
4,892,818  1/1990  Ramp .......................................... 435/30
5,156,742  10/1992  Struewing ................................ 210/605
5,507,946  4/1996  Stearns .................................... 210/202

FOREIGN PATENT DOCUMENTS 0 399 380  11/1990  European Pat. Off. .
39 16 250  2/1990  Germany .
295 02 701 U  4/1995  Germany .
655 083  3/1986  Switzerland .

*Primary Examiner*—David A. Simmons
*Assistant Examiner*—Betsey J. Morrison
*Attorney, Agent, or Firm*—Marshall & Melhorn

[57] ABSTRACT

This clarification plant consists of a circulating reactor in a housing which has a treatment area and a sedimentation area and which is characterized by at least one gas-input element and at least one treatment element which interlock with each other; in the gas input element, the water to be purified is highly enriched with oxygen and subsequently undergoes strong turbulence in the treatment element. The gas input elements and the treatment elements are modularly constructed out of disk-shaped components so that the clarification plant can be scaled as desired. The main purification is done by means of biological reduction processes in micro-organisms which are specifically introduced or cultivated.

15 Claims, 12 Drawing Sheets

FIG. II

CLARIFICATION PLANT FOR WATER PURIFICATION

BACKGROUND OF THE INVENTION

1. Field of the Invention

The present invention relates to a clarification plant for treating water with a container which has a water inlet and a water outlet and whose inner space comprises a treatment area and a sedimentation area arranged thereunder.

2. Description of the Prior Art

Clarification plants of this type are used for purifying and treating water and waste water from industry and households.

It is crucial thereby that as complete a removal as possible of noxious substances takes place and that the water has a high oxygen content after treatment. The main purification is thereby achieved by means of biological degradation processes by micro-organisms which are specifically introduced to the waste water or are cultivated in the clearing basin.

In production plants there occur organically highly polluted waste waters which according to the respective statutes for indirect discharges must be pre-purified to a prescribed COD-limiting value. This purification must therefore also take place in constricted spatial conditions in the production plants.

For this purpose, conventional clarification plants are used in which the water to be treated is introduced into various basins one after the other. In a first basin there takes place a mechanical pre-clarification of the water which is then directed into a basin for aeration by oxygen. In this aeration tank, the water is aerated with pure oxygen or with air and hence the oxygen content of the water is increased. In this basin or also in an adjacent basin the biological purification stage is completed, in which, with the aid of micro-organisms, most of the noxious substances in the water to be treated are degraded. In this process, a great deal of oxygen is consumed by the micro-organisms with the result that a constant supply of oxygen must be maintained. In order to prevent agglomeration of the micro-organisms into larger biological structures and the settling of these micro-organisms on the base of the container, the waste water must be constantly agitated. Adjacent to the biological clearing basin there is a sedimentation area in which surplus suspended matter in the waste water, such as for example agglomerations of micro-organisms as sewage sludge, are deposited. This area of the clarification plant is designed as a still zone for the treated water. The water which is extracted from the sedimentation basin is extensively free of noxious substances and, after further enrichment with oxygen, can be released into the environment.

The described clarification plant has a very high spatial requirement since an individual basin is required for the individual functions of pre-clarification, biological purification and sedimentation and also oxygen enrichment of the clarified water.

A disadvantage furthermore in the reactors according to the state of the art is that a high input of air is necessary for adequate enrichment of the water to be purified with oxygen and that these reactors have a very high energy consumption for the air introduction and the circulation of the liquid to be purified.

SUMMARY OF THE INVENTION

It is the object of the present invention to make available a clarification plant which has a high purification capacity with respect to volume and time and also small dimensions and a low energy consumption.

Furthermore it is the object of the present invention to make available a clarification plant which can be assembled or dismantled simply and cheaply.

This objective is resolved by the clarification plant according to the preamble of claim 1 in conjunction with its characterising features.

The clarification plant according to the invention consists solely of a housing as a liquid container which comprises a treatment area and a sedimentation area and in which there is arranged in an appropriate manner a gas-input element and a treatment element which interlocks with the latter.

By oxygenating the water in the gas-input element, a buoyancy is produced within the liquid to be purified, so that the liquid to be purified is conveyed through the gas-input element and through the treatment element. In the clarification plant according to the invention therefore, mechanical devices for conveying and circulating the water to be treated are superfluous. This leads to a clear reduction in the installation and maintenance costs and also to a noticeably smaller energy consumption according to the invention. Furthermore by oxygenating the water to be treated directly before turbulence of the water in the treatment element, a level of saturation of the water with oxygen which up till now was scarcely possible is achieved as a result of which the achievable biological degradation capacity of the clarification plant according to the invention is very high. The turbulence of the water in the treatment element leads furthermore to a very fine distribution of the micro-organisms suspended in the waste water since their agglomeration is greatly impeded. There results a large interphase interface between the micro-organisms and the noxious substance substratum of the water to be treated, resulting in the attainment of a very high biological rate of degradation of the noxious substances.

In the clarification plant according to the invention a circulating reactor is used because of the direction of flow of the water to be treated from the inlet of the gas-input element to the outlet of the treatment element and back around these elements to the inlet of the gas-input element. There takes place thereby the aerobic biological purification of the water within the treatment element while the return flow, which takes place outwith the treatment elements, leads in anaerobic conditions amongst other things to a reduction in nitrates in the water and to suppression of the formation of chlamydobacteriales. In the clarification plant according to the invention, aerobic and anaerobic clearing stages are initiated consequently one after another in a cyclical fashion in a simple manner in the same housing. The duration of the respective clearing stage can be influenced by the volume of the treatment elements and by the circulation speed produced by the oxygenation of the water.

By means of particularly intensive air introduction via the gas-input element in periodic pulses the buoyancy and hence the circulation speed of the water to be treated can be increased step-wise and also with a strong admission of air a purification operation can be achieved in the gas-input element and the treatment element.

Advantageous further developments of he clarification plant according to the invention are given in the dependent claims.

Particularly simple flow conditions occur when the gas-input element and the treatment element are arranged vertically and, as a result, the buoyancy produced by oxygenation of the water to be treated is exploited to the maximum.

The geometry, i.e. height, width or depth of the clarification plant according to the invention can hence be chosen, while maintaining the desired volumes of individual clarification plant components and maintaining the desired length of stay in the treatment element, in such a way that several gas-input elements are used which are connected via distributors to any number of treatment elements respectively. Alternatively, several arrangements of gas-input elements and treatment elements can also be arranged one above the other in series. Hence, any desired treatment volume can be realised in any dimension in a simple manner.

In an advantageous manner there is arranged beneath the gas-input element a sedimentation area which is provided with a bio-mass outlet so that the produced and deposited bio-mass which is no longer required for the further purification process can be removed periodically from the clarification plant according to the invention via the bio-mass outlet.

It is particularly advantageous if a rest zone is arranged directly in front of the water outlet and separated from the circulating liquid by a dividing wall, said rest zone being fitted with canted plates so that a further sedimentation zone occurs there for removing residues of suspended particles in the purified water.

The flow velocity within the gas-input element and the treatment element can also be influenced via a submerged pump, the suction side of which is connected above the sedimentation area and the discharge side of which is connected to the inlet of the gas-input element. Furthermore, it is possible within the gas-input element or the treatment element to install agitation elements, worm-like elements or rotor blades which are actuated from outside and take care of additional conveyance or agitation of the water to be treated.

Monitoring of the filling height of the clarification plant according to the invention with water to be treated can take place by means of a float switch.

For final oxidation of the treated water which has been removed from the water outlet a trickling section may adjoin the water outlet, into which trickling section the purified water can be enriched additionally with oxygen in order to produce the prescribed oxygen content for introduction into the sewage system or into the ecosphere.

The gas-input element, the treatment element and the trickling element of the clarification plant according to the invention can be composed at least partly from identical or similar disc-shaped components so that the clarification plant can be scaled as desired. As a result, the clarification plant according to the invention can also be used economically for the smallest amounts of waste water. Accommodation to an altered requirement can also take place subsequently since the assembly and dismantling of the gas-input element and the treatment element are very simple. On the basis of the clarification plant according to the invention having the capacity to be scaled as desired, the costs for carrying out the waste water clarification can also correspond respectively to the requirement and be minimised.

A particularly simple and cost-effective construction of the gas-input element, the treatment element end also the trickling element results from using components which have an outer ring channel and an inner ring channel and also several webs extending between these channels. The webs can open out thereby into the outer ring and/or the inner ring channel so that a channel system occurs via which for example substances such as nutrient solutions, gases or even enzymes can be added. Such a supply means is especially simple if the elements are made of ceramic and the ceramic has a porous structure. Thus the gas-input element consists, in an advantageous manner, of components of this type which have an air-permeable, porous structure so that very fine air bubbles can be introduced into the water to be treated via the outer ring channel and the webs. By means of this particular structure, there results a degree of oxygen enrichment in the water to be treated of a level scarcely attainable using conventional measures. This increases the buoyancy from the gas-input element to the treatment element and in addition improves the effectiveness of the biological purification in the following aerobic treatment stage. In a similar manner, the components from which the treatment element is formed can have appropriately formed webs which lead to a specific, turbulent agitation of the water to be treated. As a result, the agglomeration of the micro-organisms to larger complexes is prevented and an interface size is achieved between the micro-organisms and the water to be treated which is not achieved with the conventional technique. This also considerably improves the biological purification effect within the treatment element. The trickling element can likewise be constructed from components with correspondingly formed webs.

A further advantageous embodiment of the components has a duct in the centre of the inner ring channel which can receive a central shaft extending in the axis of the component. With individual components, the central shaft can then be connected to the webs so that the webs in the form of agitation elements, worm elements or rotor blades can be rotated to produce a current. The driving force of the central shaft results thereby from outside. This represents a particularly simple opportunity to monitor the flow velocity in individual treatment elements individually and independently from one another.

The periodic introduction described above of additional quantities of gases into the liquid to be treated, in order to produce an additional driving force or a purification effect within the clarification plant according to the invention, can also be achieved via an additional compressed air pipe which is connected to the gas-input element and introduces in pulses large quantities of compressed air into the liquid to be treated via corresponding components which hare especially large pores.

BRIEF DESCRIPTION OF THE DRAWINGS

A few embodiments, given by way of example, of the clarification plant according to the invention are described subsequently.

DESCRIPTION OF THE PREFERRED EMBODIMENTS

Figure 1:
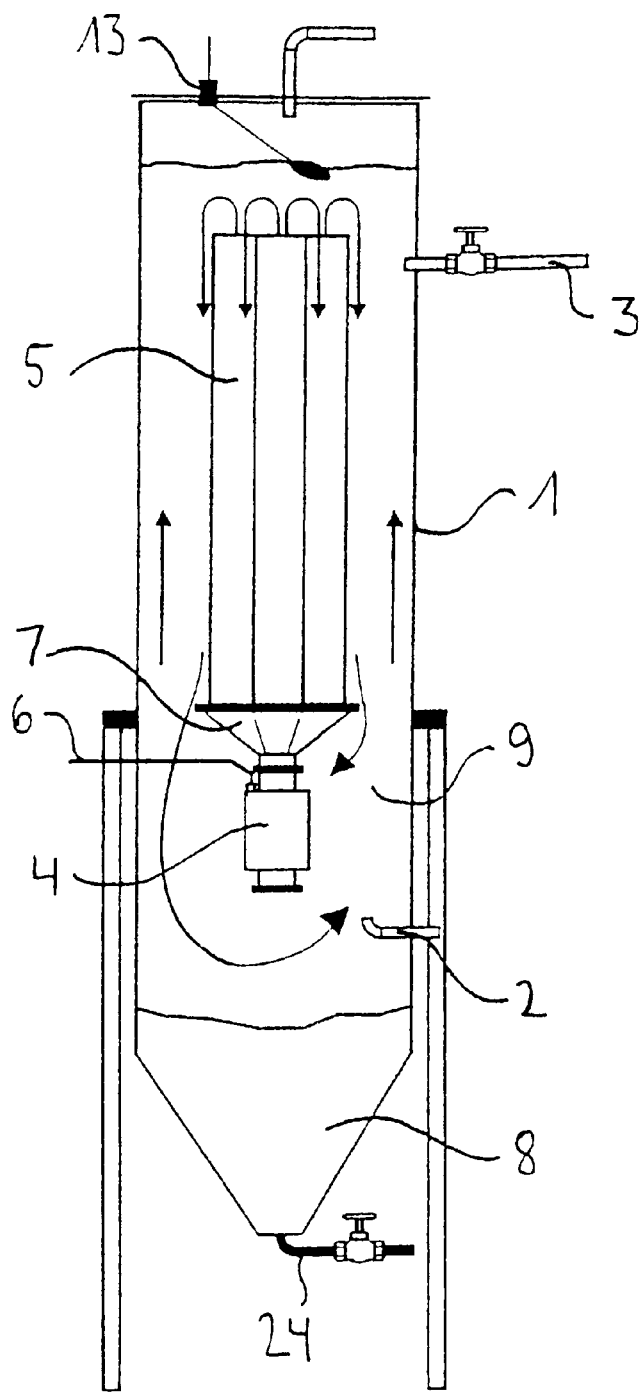
FIG. 1 shows a clarification plant according to the invention.

FIG. 1 shows a clarification plant according to the invention. A water inlet 2 is installed on a housing 1 for supplying water to be treated and there is also a water outlet 3 as a clarified outlet. Furthermore, in the housing 1 and vertically one above the other there are arranged one gas-input element 4 and a plurality of treatment elements 5 which are connected via a distributor 7 with one another. Beneath the gas-input element 4 a sedimentation area is located for the deposition of surplus bio-mass. The area above the sedimentation area 8 is designated as a treatment area 9.

The gas-input element 4 is connected to a gas supply line 6 via which the oxygen or atmospheric air required for oxygenating the water to be treated are supplied to the gas-input element 4.

In order to operate the clarification plant according to the invention water to be treated is supplied via the water inlet 2 up to a level established via a float switch 13. Next, oxygen-containing air is blown into the gas-input element 4 via the gas supply line so that the liquid located therein experiences a buoyancy and is moved by the gas-input element 4 to the treatment element 5 and right through this. By means of this flow, water is sucked into the treatment area directly above the sedimentation area and is likewise forced into the treatment elements 5 by the gas-input element 6 and the distributor.

In the gas-input element 6, the water to be treated is greatly enriched with oxygen so that a biological, aerobic reduction of the noxious substances is performed in the treatment elements 5. In these treatment elements, the water is agitated very powerfully, so that the micro-organisms located there do not agglomerate into large complexes. Consequently, the contact surface between the micro-organisms and the water to be treated is kept high, as a result of which the capacity for degradation of the noxious substances is greatly increased.

After passing through the treatment elements, the oxygen in the water to be treated is extensively consumed by the micro-organisms. The water to be treated flows thus in anaerobic conditions along the outside of the treatment elements 5 back into the likewise anaerobic sedimentation area 8. In these anaerobic areas the water is purified for example by the removal of nitrogen compounds in addition by anaerobically living micro-organisms. Furthermore, there is suppression here of the undesired formation of chlamydobacteriales During reduction of noxious substances the bio-mass of the micro-organisms is increased so that the surplus bio-mass is now deposited in the sedimentation area 8. From there it can be removed as desired via a bio-mass outlet 24 as sewage sludge.

The treated water flows partly back into the gas-input element 4 and the treatment elements, and there it is purified further or mixed with freshly supplied water to be treated or it is removed via the clarified outlet 3 as treated water. Next, it can be enriched further with oxygen via a trickling section.

Figure 2:
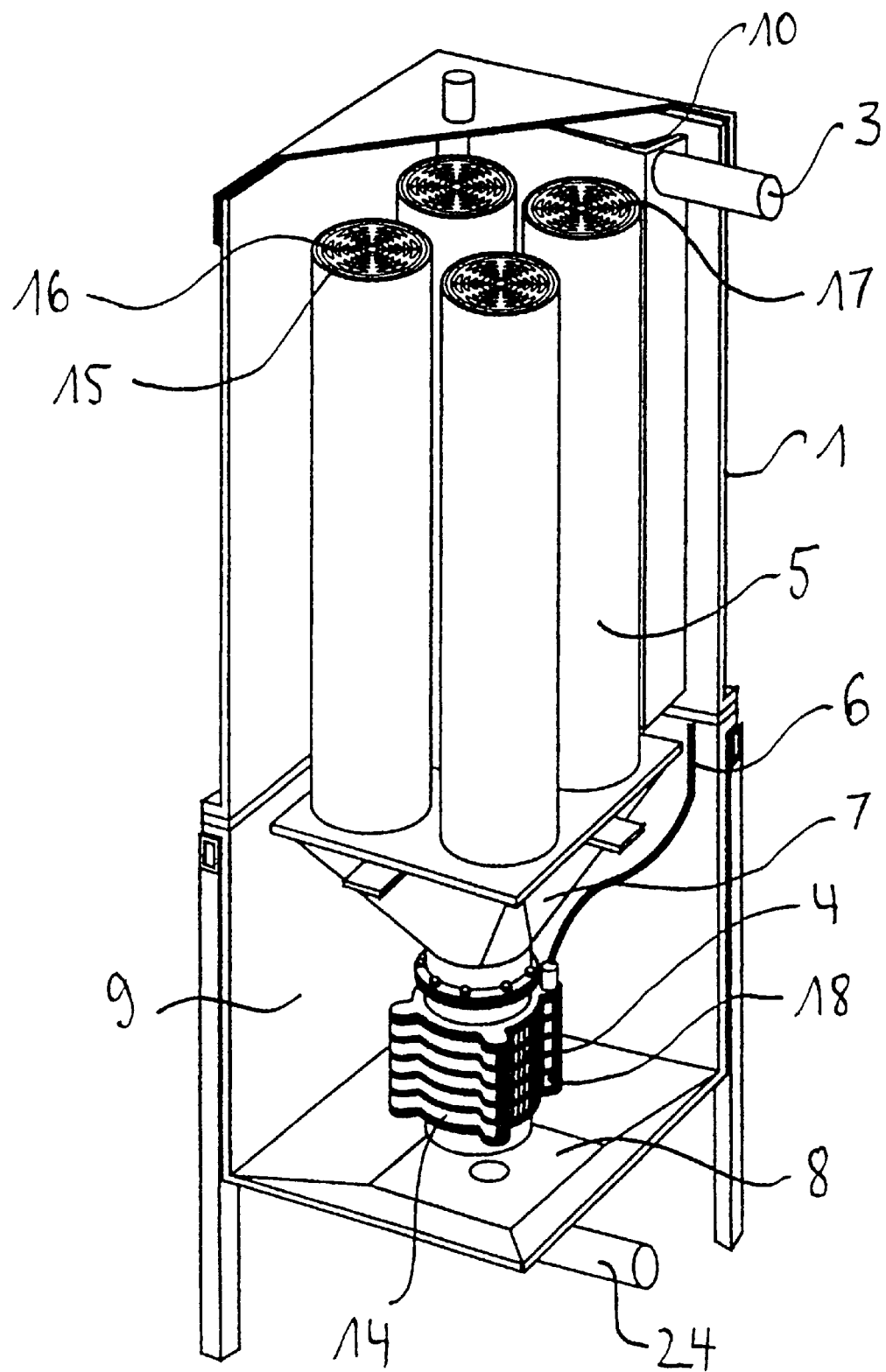
FIG. 2 shows a section through a clarification plant according to the invention.

FIG. 2 shows a clarification plant according to the invention with four treatment elements in total. The design of this clarification plant according to the invention is essentially identical to the clarification plant shown in FIG. 1. It can also be seen very clearly that the four treatment elements 5 are connected via a funnel-shaped distributor to the gas-input element 4. The gas-input element consists of five disc-shaped components which on their periphery have in total four recesses respectively which are offset to one another by an angle of 90° and orientated in the direction of flow of the water and via which components oxygen is supplied under pressure to the individual components of the gas supply line 6.

The four treatment elements 5 are constructed from disc-shaped components which have an outer ring channel 15 and an inner channel 16 and also webs 17 extending radially between these channels. These webs 17 cause turbulence in the water to be treated.

On the basis of the selected modular principle and the use of module-like components, assembly, dismantling and alteration of the clarification plant according to the invention is possible at any time with the smallest demand on labour and cost.

Figure 3:
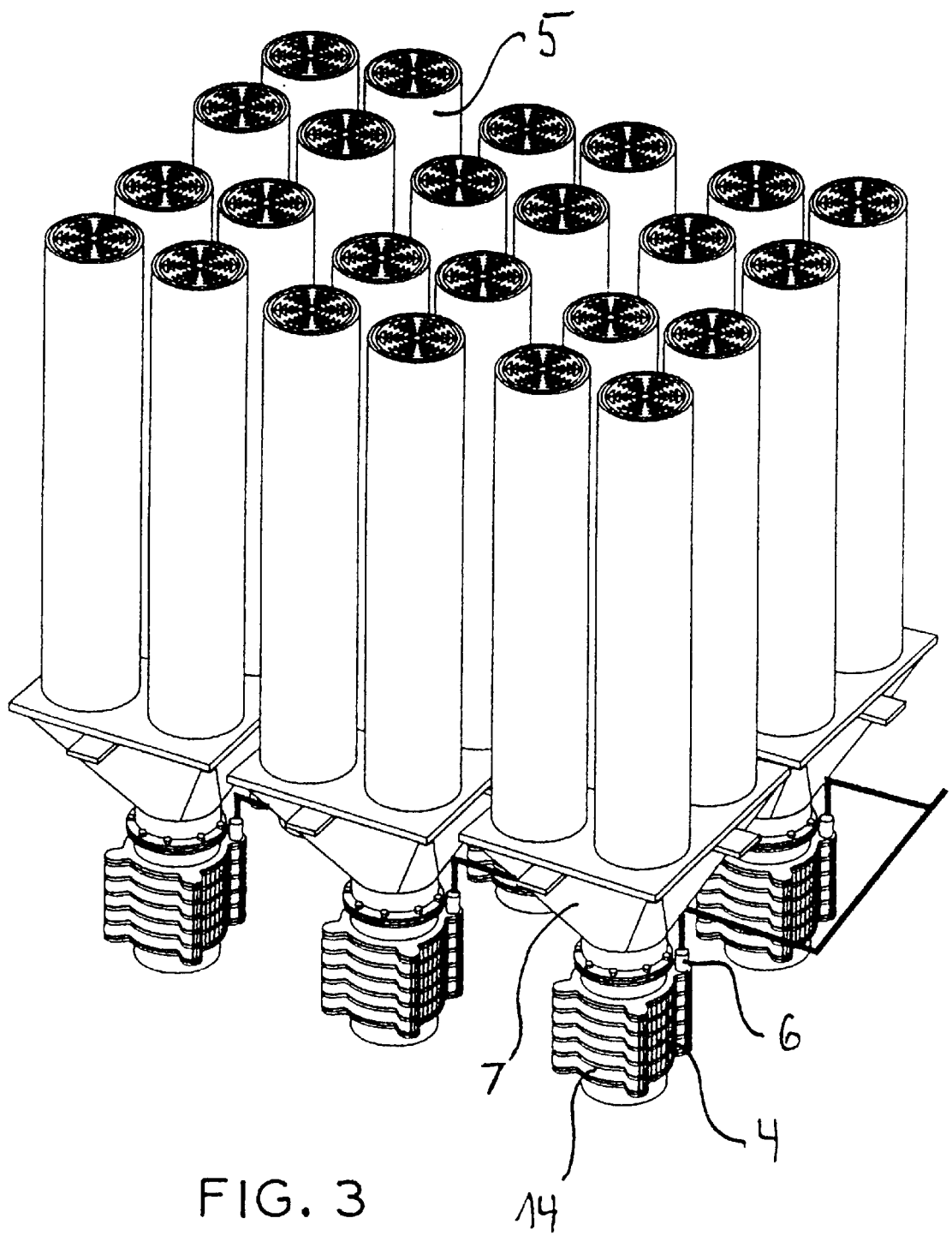
FIG. 3 shows an arrangement according to the invention of gas-input elements and treatment elements.

FIG. 3 shows an arrangement of gas-input elements 4, distributors 7 and treatment elements 5 with in total six gas-input elements 4 and twenty-four treatment elements 5. A unit of this type is also suitable for purifying large quantities of water.

Figure 4:
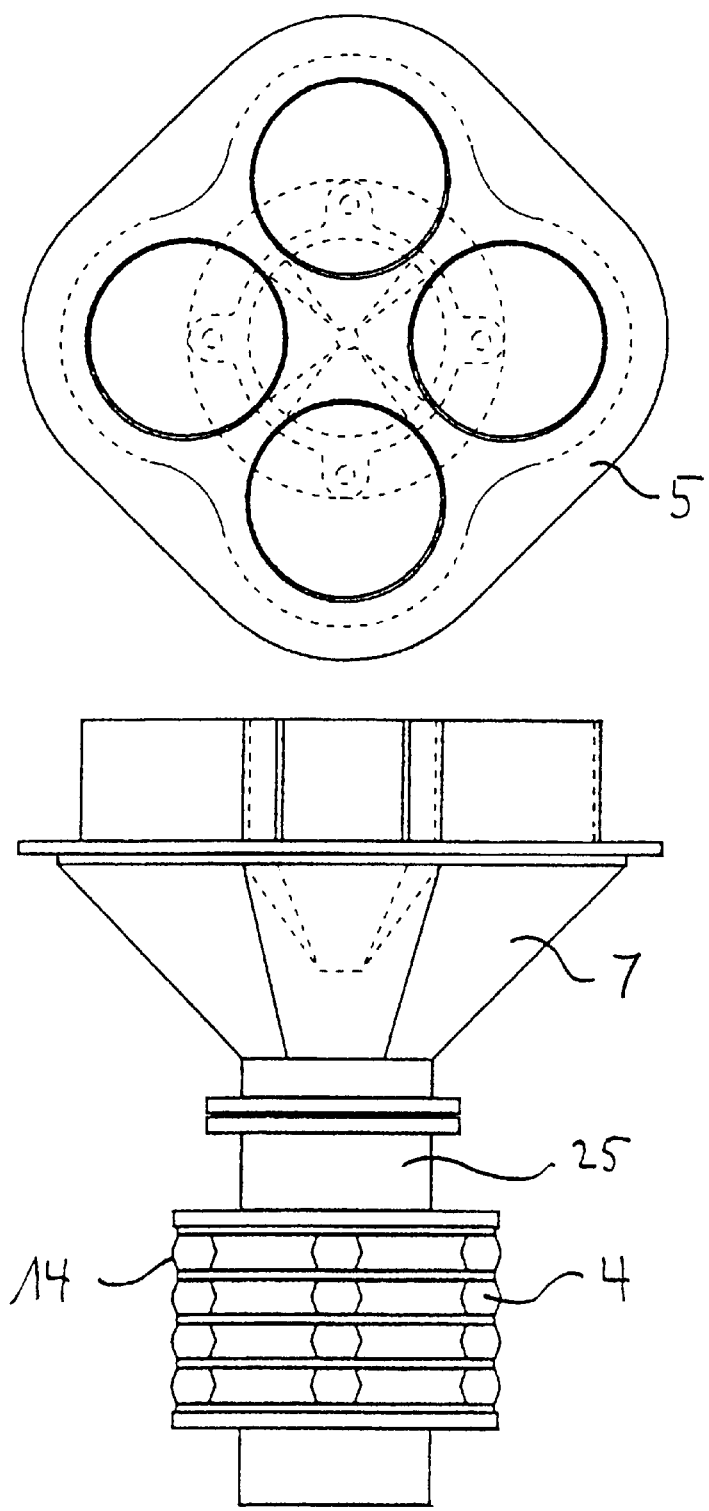
FIG. 4 shows the connection between the gas-input element and four treatment elements.

FIG. 4 shows in section, however, a gas-input element 4 which is constructed from in total four disc-shaped elements 14 and which is flanged by its outlet 25 to a distributor 7. The distributor opens into altogether four treatment elements 5. It is achieved by means of this arrangement that the liquid which has been oxygenated in a gas-input element 4 is then conveyed to in total four treatment elements 5.

Figure 5:
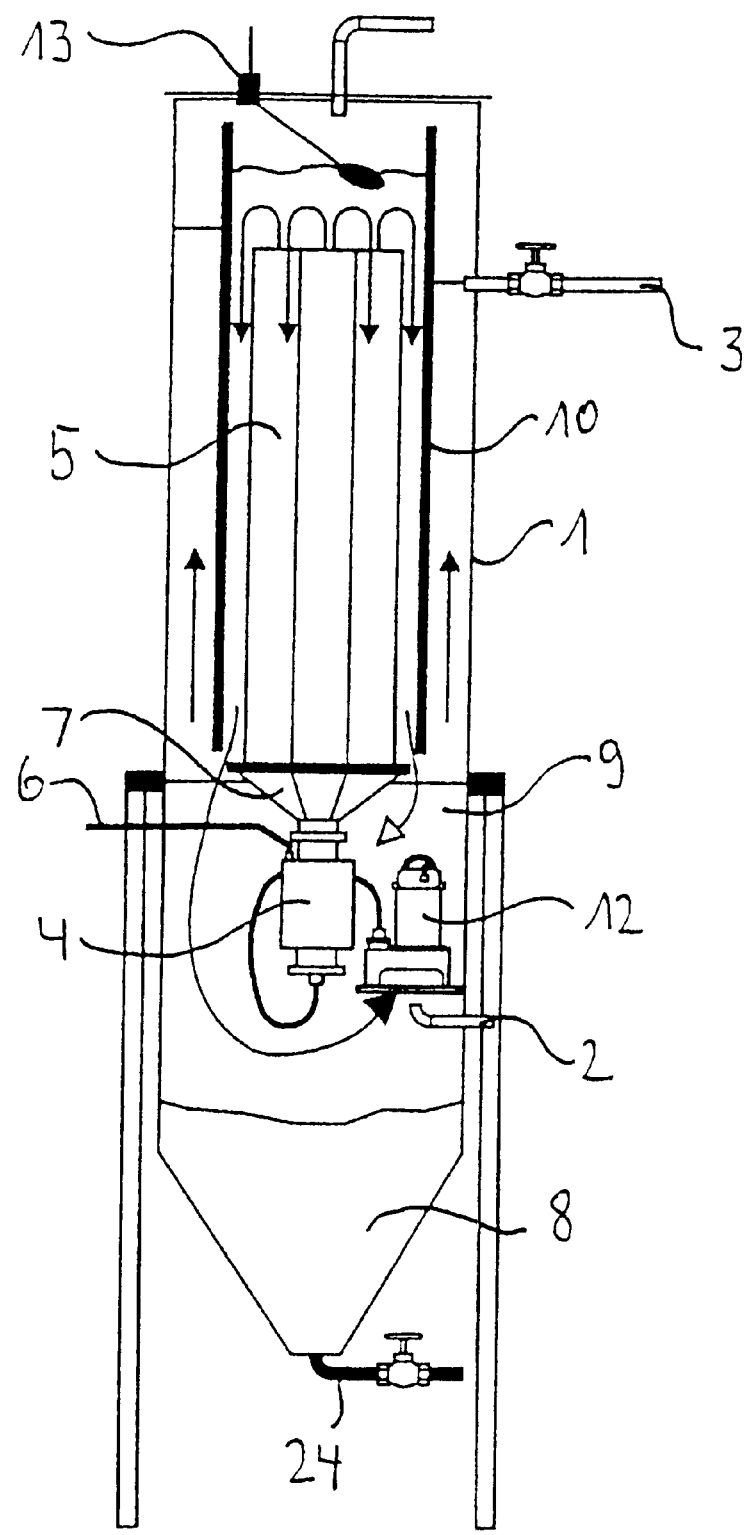
FIG. 5 shows a further clarification plant according to the invention.

FIG. 5 shows a clarification plant according to the invention, which is constructed similarly to the clarification plant shown in FIG. 1. The same parts of the clarification plant are thereby designated with the same reference numbers. In this clarification plant, the outlet from the treatments elements 5 to the clarified outlet 3 is divided by a wall 10 so that an additional still zone occurs immediately in front of the clarified outlet 3 between the housing 1 and the wall 10. At the wall 10 and the housing 1 in this still zone, plates can be inserted which are directed obliquely upwards and are for example at an angle of 30° to the wall 10 so that any residual suspended matter, which is still in the treated water, is deposited on these plates. Therefore, there results an additional residual sedimentation area directly in front of the clarification outlet 3.

Furthermore the inlet of the gas-input element 4 is connected to the discharge side of a suction pump 12, the suction side of which lies in the intermediate area between the sedimentation area 8 and the treatment area 9. By means of the submerged pump 12, the flow velocity of the water to be treated can be controlled in addition by the gas-input element 4 and the treatment elements 5 as a result of which the degree of oxygenation of the water in the gas-input element 4 may likewise be influenced.

Figure 6:
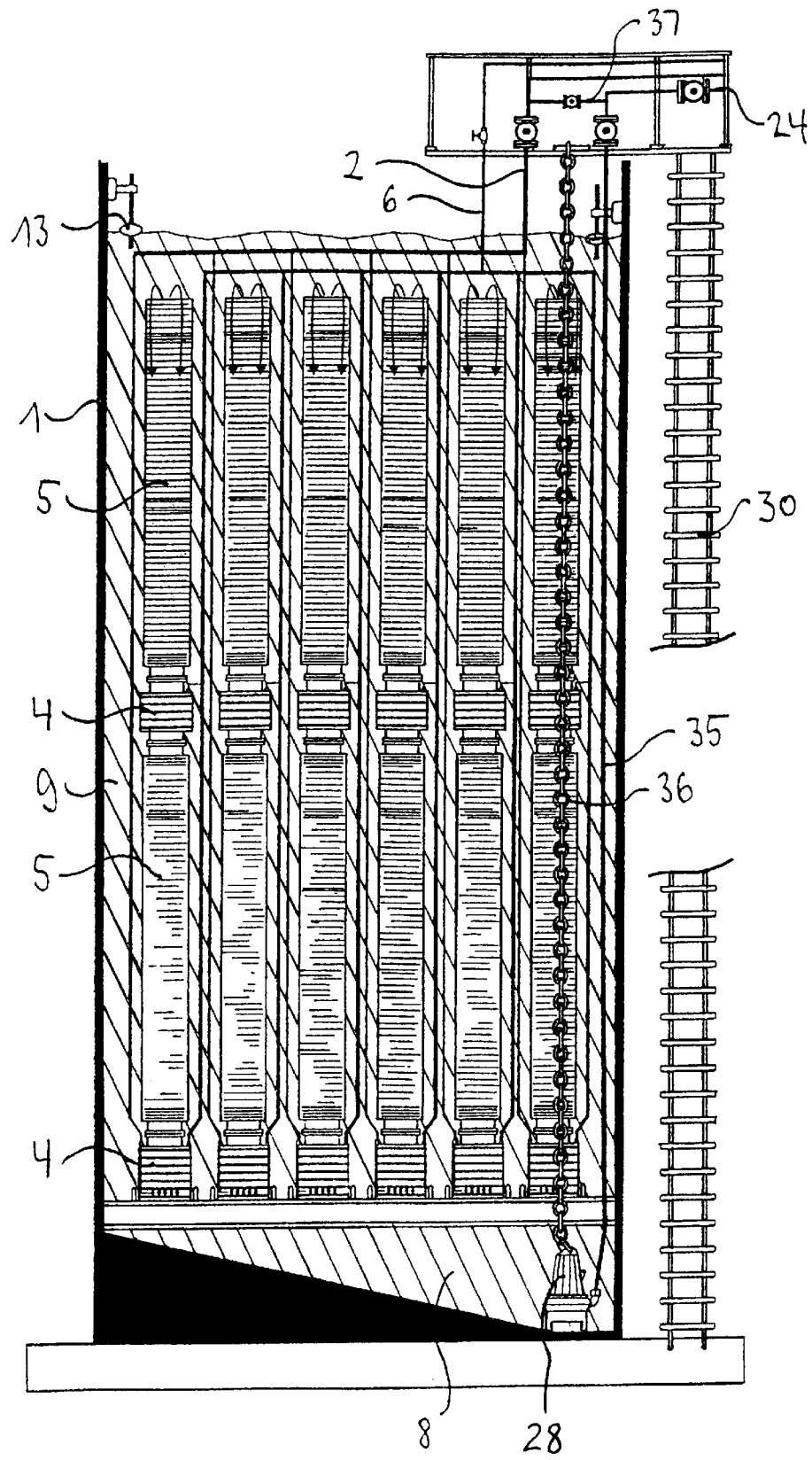
FIG. 6 shows a further clarification plant according to the invention.

FIG. 6 shows a further example of a clarification plant according to the invention in which operating elements, which are accessible from outside, are arranged above the housing 1 and are accessible via a ladder 30. The housing 1 comprises here a multiplicity of treatment elements 5 which are interlocked with gas-input elements 4 at their respective lower end. Several of the units of gas-input element 4 and treatment element 5 are thereby arranged one above the other and are connected to one another in such a manner that the water to be purified flows from the respective lower treatment element 5 through a gas-input element 4 into the next treatment element 5. The gas-input element 4 has a further connection which is connected to the waste water inlet pipe 2. The waste water is directed through this pipe 2 directly into the lowest gas-input element 4 where it is enriched with oxygen for a first time. The supply of waste water is monitored via a float switch 13.

In this clarification plant also, the water now enriched with oxygen flows upwards through the treatment element 5, in which biological clarification takes place. At the end of the first treatment element, the oxygen content of the water is extensively consumed by the micro-organisms so that the now already extensively pre-cleaned water is replenished for a second time in a gas input element 4 with oxygen. Next, it runs through an upper treatment element 5. At the end of the purification, the water emerges at the upper end of the upper treatment element 5 and flows along the outer side of the treatment element 5 downwards into the sedimentation area 8. In this sedimentation area 8, the surplus of micro-organisms is then deposited and may be removed when required by a submerged pump 28 and via a pipe 35 and also via the bio-mass outlet 24. The pump 28 can for example by actuated from above the housing 1 via a chain 36 extending through the housing 1. Between the sewage sludge pipe 35 and the waste water supply line 2 there exists a connecting pipe 37, via which the waste water can be injected continuously or from time to time with sewage sludge and hence with living micro-organisms.

The unit shown in FIG. 6 is particularly suitable for purifying, in as complete a manner as possible, highly polluted waste water in a small space and with a small expenditure of energy. Because of the stacked arrangement of the units of gas-input elements 4 and treatment elements 5 a very long purification section is achieved.

During purification of the waste water heat arises because of the metabolism of the micro-organisms so that the temperature of the waste water along the treatment elements changes. With the help of heat exchangers which likewise consist of individual components, the temperature can indeed be regulated in such a way that, everywhere in the treatment elements, the optimal temperatures can be extensively maintained for the desired micro-organisms which are specific to the noxious substances.

Figure 7:
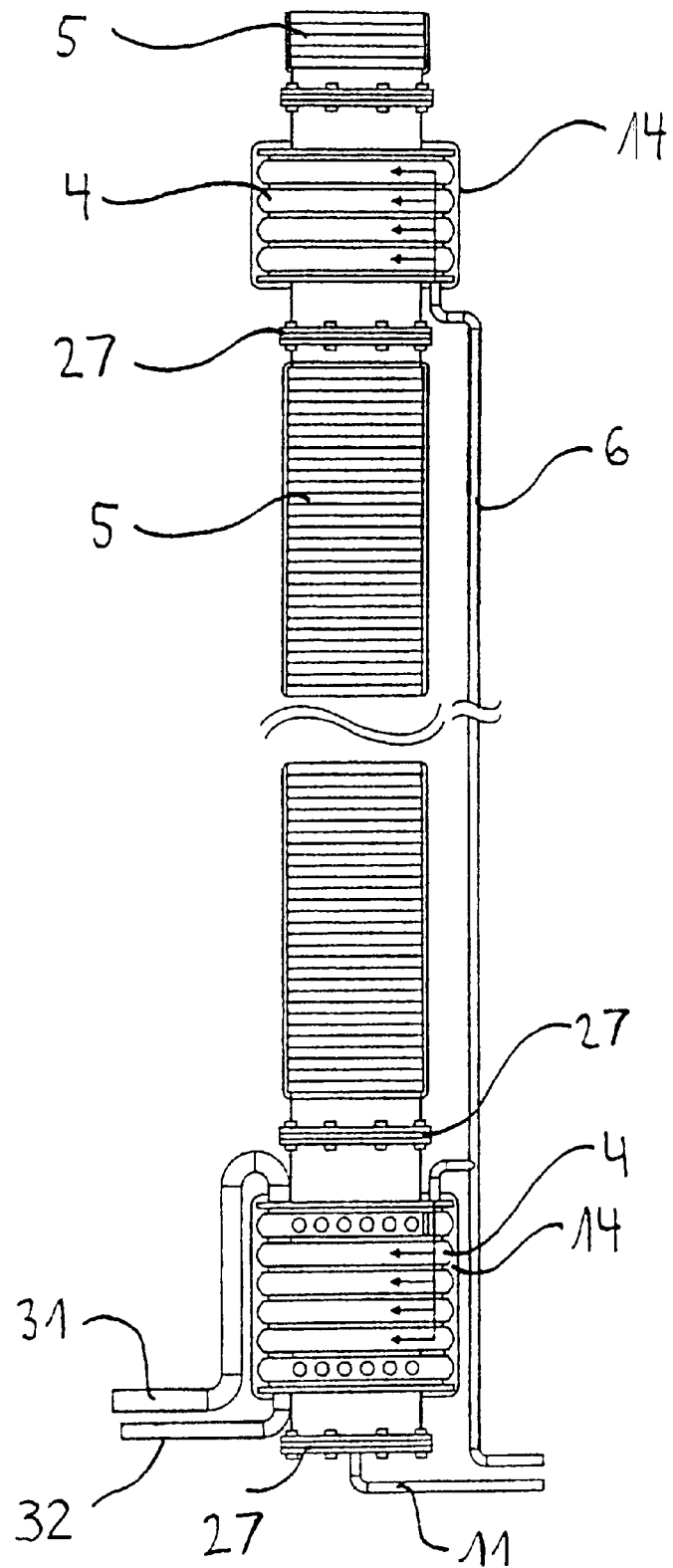
FIG. 7 shows an arrangement according to the invention of treatment elements and gas-input elements.

FIG. 7 shows an arrangement according to the invention of treatment elements 5 and gas-input elements 4. Alternatively, a gas-input element 4 and a treatment element 5 may be interlocked with one another respectively. As a result, a very long column results which consists of an alternating series of gas-input elements 4 and treatment elements 5. The gas-input elements 4 consist of a series of disc-shaped components 14. The lowest gas-input element 4 consists of six components 14 while the further gas-input elements of the column consist of four components respectively. Four of the components of the gas-input elements 4 are connected respectively with a gas supply line 6. In the lowest gas-input element 4 a component is connected to a supply line 31 for waste water and a further component 14 is connected to a supply line 32 for sewage sludge. This lowest gas-input element 4 has a flange 27, which is connected to a second compressed gas supply line, at its entrance.

Via the pipe 31, waste water is fed into the interior of the gas-input element via one of the components 14 of the lowest gas-input element 4. Via the pipe 32, sewage sludge is added to the waste water via a further component 14 of the lowest gas-input element 4 in order to inject the said waste water with living micro-organisms for biological purification.

The remaining four components 14 of the gas-input element 4 serve to oxygenate the waste water by supplying atmospheric compressed air or pure oxygen via the gas supply line 6.

This gas supply line 6 is likewise connected to the components 14 of the further gas-input elements 4 and provides for periodic aeration of the waste water along the column.

In order to clean the column of gas-input elements 4 and treatment elements 5 when required, the lowest gas-input element 4 is connected to a second compressed air supply line 11, via which the large quantities of air may be injected. Such large quantities of air produce an additional buoyancy of the liquid located in the column and lead to a good mechanical cleaning of the column.

The arrangement shown in FIG. 7 can be provided with a sedimentation area and a housing and represents a device according to the invention which is distinguished by a high purification capacity in the smallest space.

Figure 8A:
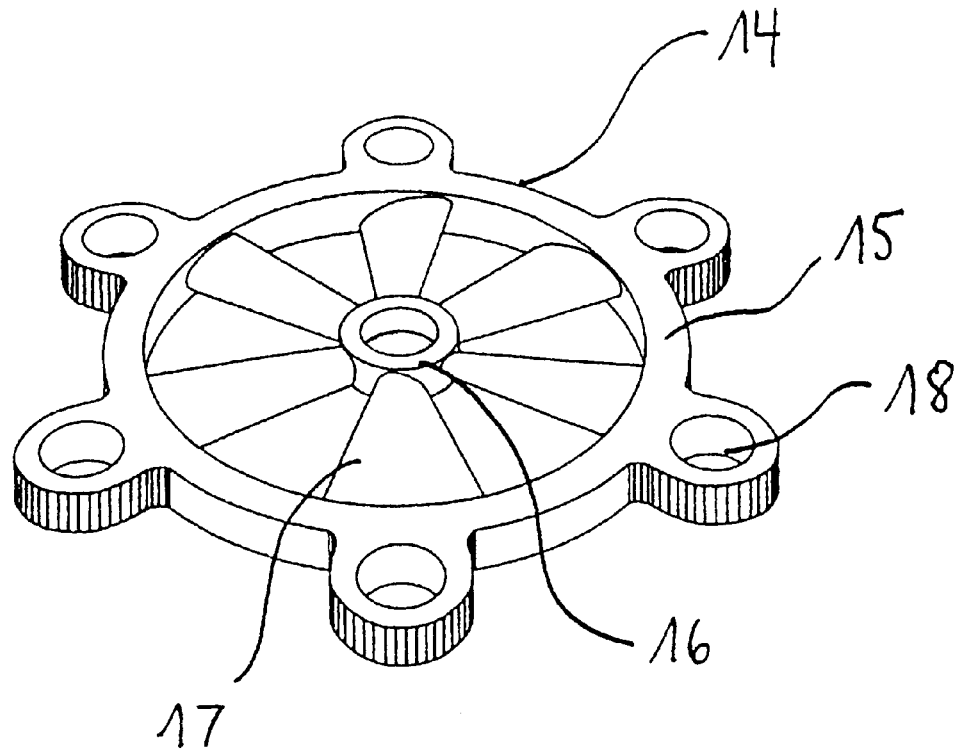
FIGS. 8a and 8b show two components with and without a central shaft duct.
Figure 8B:
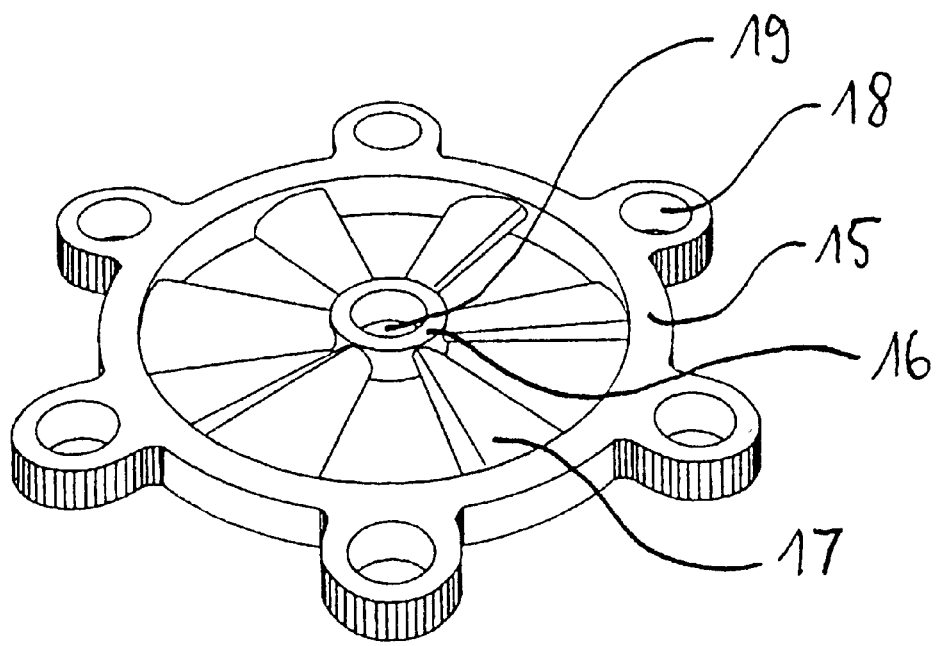

FIGS. 8a and 8b show two disc-shaped components as they are used for the construction of gas-input elements or treatment elements as for example in FIGS. 1 and 2. FIG. 8a shows a component 14 with an outer ring channel 15 and an inner ring channel 16 and also webs 17 extending radially between these channels. Furthermore, the component 14 in this example has in total six axial recesses 18, via which several components 14 stacked one above the other may be connected together or via which materials may be exchanged between several components 14 stacked one above the other. Through these axial recesses 18, a liquid with enzymes can be supplied to each component 14 for example along a column of components 14 according to the invention or a gas can be supplied into the outer ring channels 15 connected to the axial recesses 18 and directed from there into the webs 17 connected to the outer ring channels. If the webs 17 are made of a porous, for example ceramic material, then in this way large quantities of gases can be compressed in a very fine distribution into a liquid flowing within the component 14.

This possibility is made use of by using the components shown in FIG. 8a for constructing the gas-input elements 4 of FIG. 1. The gas supply line 6 is then connected at one end to one of the axial recesses 18 of a component stack while the remaining free openings, of the axial recesses 18 are closed off. If oxygen or atmospheric air is now introduced via the gas supply line 6 into the axial recesses then this air is distributed via the outer ring channel 15 to the webs 17 and is compressed through the porous ceramic wall of the webs 17 into the water to be treated.

FIG. 8b shows a similar component as in FIG. 8a, the inner ring channel 16 having a duct 19 which can receive a central shaft.

Figure 9B:
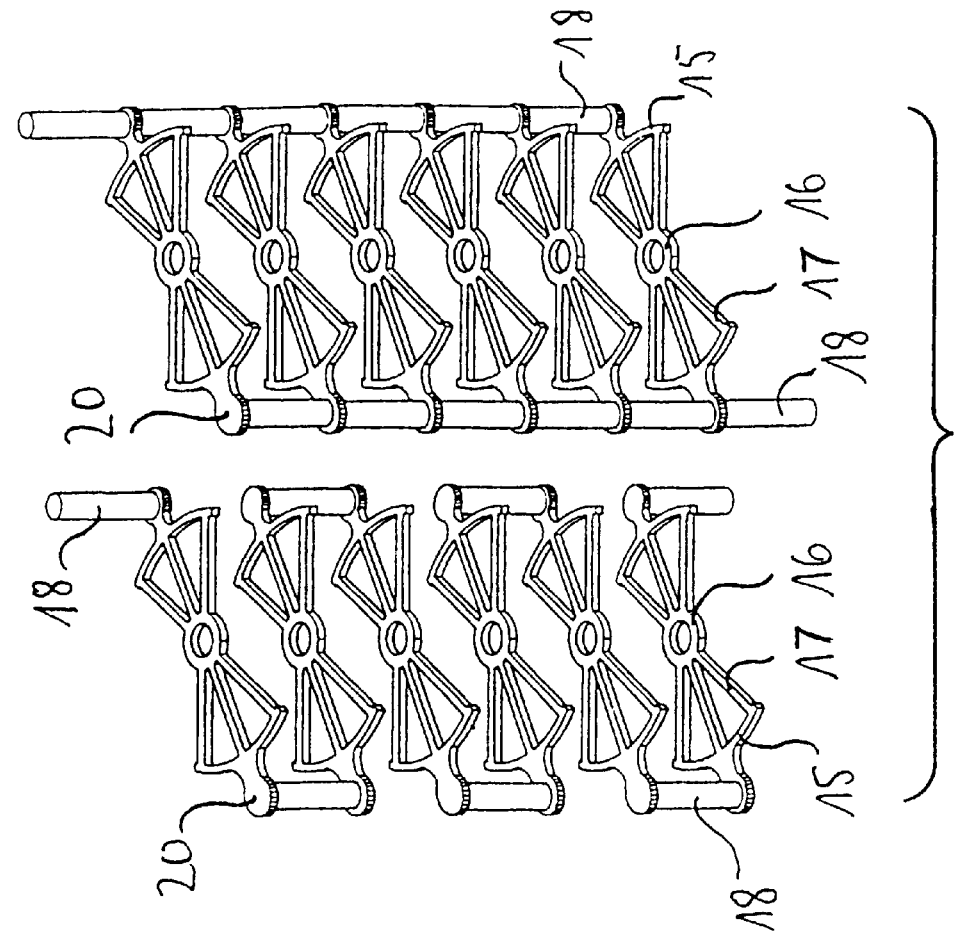
FIGS. 9a and 9b show a gas-input element in cross-section and also the course of the oxygen supply in two variants.
Figure 9A:
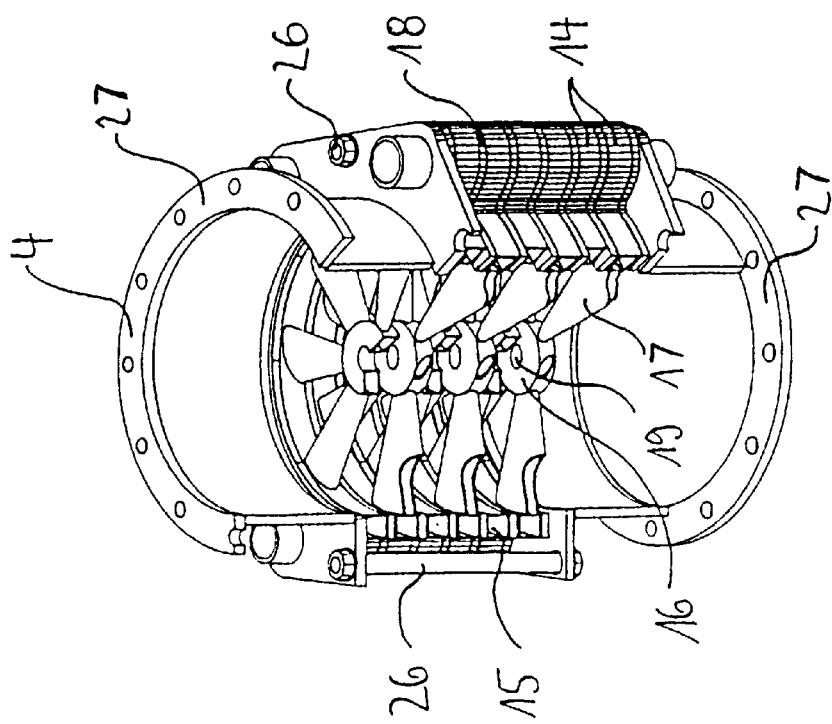

FIG. 9a shows the construction of a gas-input element made from components 14 shown in FIG. 8b. The components 14 are stacked one above the other and screwed together between the individual axial recesses 18 via screw connections 26. The axial recesses 18 of the individual components 14 are connected to one another while their open ends are closed off.

The gas-input element 4 is provided at both of its ends with one flange 27 respectively so that said element 4 can be connected at its inlet for example with a submerged pump 12 and at its outlet with a distributor 7 or also be directly connected to a treatment element 5.

FIG. 9b shows two of the many options for gas flow control within the gas-input element 4. For this purpose, the components 14 are provided between the individual axial recesses 18 and between the axial recesses and the outer ring channel 15 with breakable seals which can be easily destroyed to produce a specific direction of flow. It is possible consequently to realise within a gas-input element of this type a large number of possible ways to control the gas flow, two of which are shown in FIG. 9b. In the left-hand representation of FIG. 9b the gas is supplied respectively from one axial recess 18 via the webs 17 and the outer ring channels 15 of the opposite recess 18. There the gas within the axial recess 18 is directed to the next component 14 where a side exchange takes place in turn. Consequently, a gas flow control according to the reverse flow principle occurs through the gas-input element. In the right-hand representation of FIG. 9b, the gas is supplied via an axial recess 18 simultaneously to all the components 14 of the gas-input element 4 and directed parallel to the axial recesses 18 located opposite.

An arrangement of components 14 of this type can also be chosen for the construction of treatment elements 5; the channel system of the components 14 having the capacity to be used for example for supplying the enzymes or nutrient solutions to the liquid to be treated.

With a gas-input element as shown in FIG. 9a, an $O_2$ introduction of over 34 mg $O_2$/l was achieved. This value lies around a multiple of four above the value of 8 mg $O_2$/l which can be achieved by conventional membrane technology.

Examinations of a reactor whose gas-input elements and whose treatment elements are constructed from the mentioned components revealed that, with a degrading level of 90%, the treatment element has a purification capacity of approximately 80 kg COD/m$^3$/day. This value is double the loading rate which is achieved in laboratory experiments using a conventional bubble column reactor. Also the COD-sludge loading $L_{drysubs.}$ achieves with approximately 11 kg COD/kg dry subs./day roughly double the value of a bubble column reactor. A comparison of the bacteria agglomerations shows that the agglomerates are smaller with a clarification plant according to the invention than with a bubble column reactor or with conventional purification units, so that a greater interface results between the micro-organisms and the water to be treated with respect to the quantity of micro-organisms than with conventional clarification technology.

Figure 10:
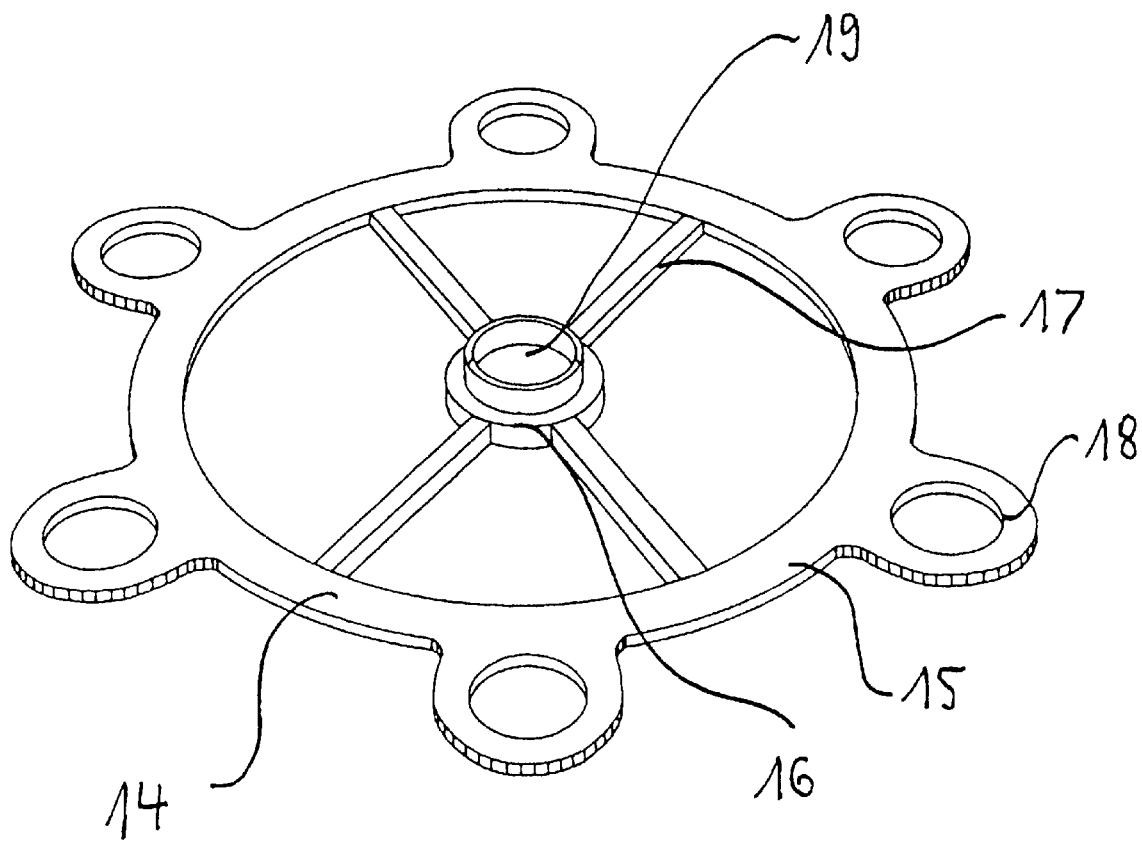
FIG. 10 shows a component with a central shaft duct.

FIG. 10 shows a further component 14 according to the invention, the inner ring 16 of which is provided with a duct 19 for a central shaft. The webs are thereby configured very thinly and serve substantially for mounting the inner ring 16. Components 14 of this type can be used for example for bearing a central shaft on the respective ends of the treatment elements 5.

Figure 11:
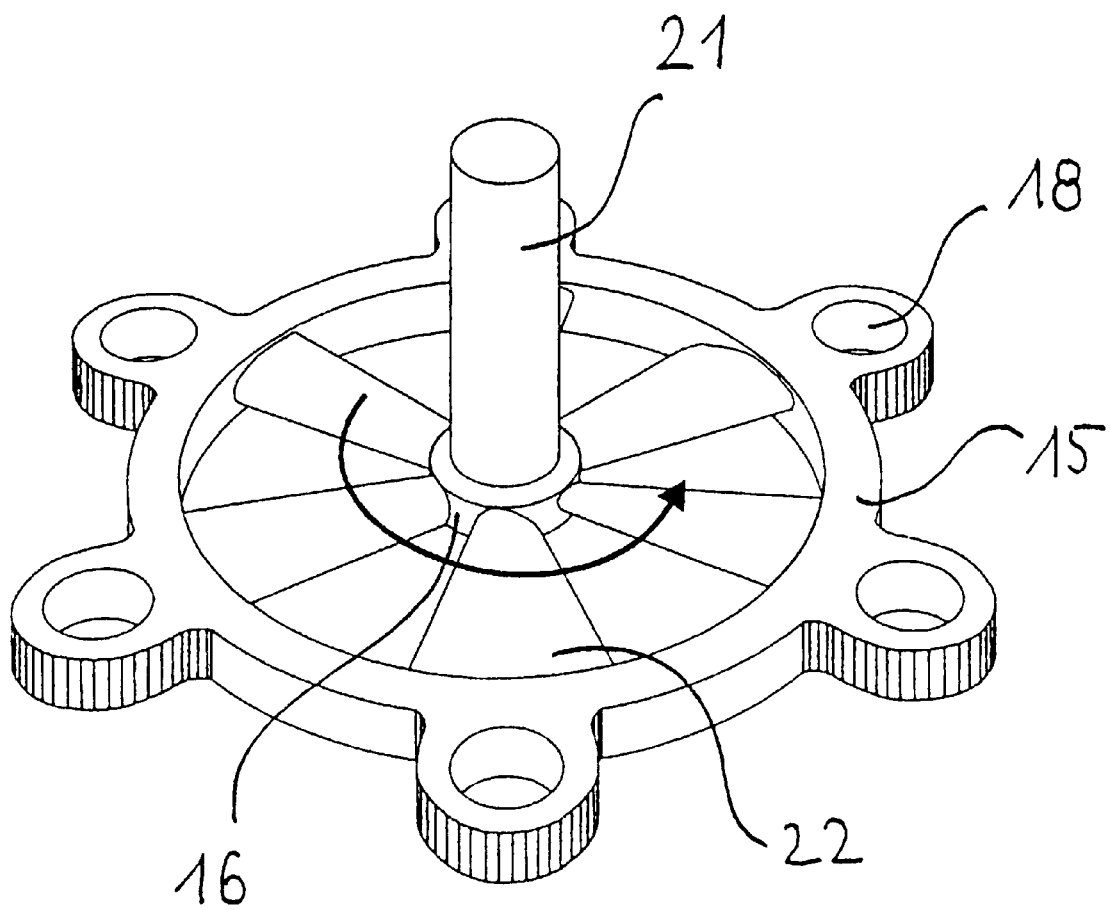
FIG. 11 shows a rotor element.

FIG. 11 shows a rotor element which has a central shaft 21 and also freely rotating webs 22 which are secured to the central shaft 21 and used as rotor blades. With a rotor element of this type, currents can be produced in liquids within the treatment or gas-input elements. Hence, especially the flow velocity can be controlled in each individual treatment element independently of the other treatment elements.

Figure 12:
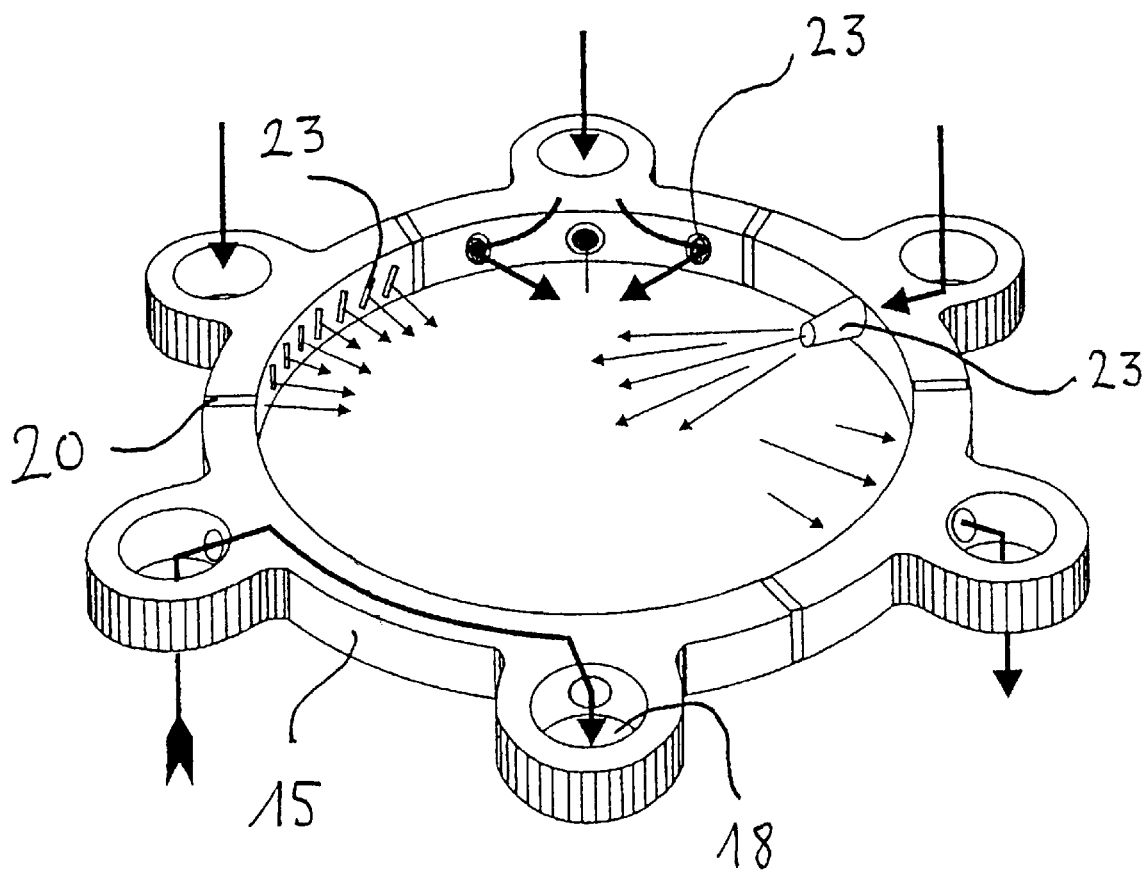
FIG. 12 shows an element for the supply of oxygen in pulses.

FIG. 12 shows an injection element as it may be used to inject in pulses large quantities of gases for example into the gas-input element 4. The gas is again directed via axial recesses 18 into the outer channel 15 and from there injected via openings 23 into the liquid flowing within the injection element. There are shown in total three different forms for openings 23, namely slots, round openings and also openings projecting nozzle-like and radially from the outer ring channel 15 into the inner volume. Components of this type can be used especially for admitting large quantities of gas to increase the buoyancy of the liquid or for thorough cleaning of the gas-input elements 4 and the treatment elements 5.

There is furthermore shown in FIG. 12 that the outer ring channel can be interrupted by seals 20 so that a plurality of gases and liquids can also be directed in the packing direction of the components via the axial recesses 18, independently of one another. The various currents are shown by arrows. This component can be connected to each of the described components.

What is claimed is:

1. Clarification plant for treating water with a container which has a water inlet and a water outlet and whose inner space comprises a treatment area and a sedimentation area arranged thereunder; there being arranged in the treatment area at least one gas-input element for oxygenation of the water and at least one treatment element, wherein the at least one gas-input element and the at least one treatment element are arranged one above the other in a column-like shape and between these and the wall of the container lies a part of the treatment area; the gas-input element is provided with at least one water inlet and at least one water outlet and has several disc-shaped components which are connected together into a stack through which the water moves; the water inlet of at least one gas-input element being connected to the sedimentation area, and the at least one treatment element is provided with an inlet and an outlet and the water outlet of the gas-input element is interlocked with the inlet of at least one treatment element; the water emerging from the gas-input element being agitated specifically and thoroughly mixed during flow through the treatment element and after emerging from the treatment element flowing between its outer side and the wall of the container to the sedimentation area.

2. Clarification plant according to claim 1, wherein the outlet of the treatment element or one of the treatment elements is connected to the inlet of a further gas-input element to which a further treatment element is attached.

3. Clarification plant according to claim 2, wherein several gas input elements and treatment elements are arranged to form a column.

4. Clarification plant according to claim 1, wherein each gas-input element is connected to several treatment elements via a distributor.

5. Clarification plant according to claim 1, wherein the water outlet is separated from the treatment area by a wall to form a separated part; the separated part near the sedimentation area interconnecting with the treatment and/or the sedimentation area.

6. Clarification plant according to claim 5, wherein in the separated part, the container and/or the wall are provided with plates extending upwards.

7. Clarification plant according to claim 1, wherein the inlet of the gas-input element is connected to the discharge side of a submerged pump, which is arranged in the container and whose suction connection piece is located between the sedimentation area and the treatment area.

8. Clarification plant according to claim 1, wherein the gas-input element and/or the treatment element are formed at least in part from a stack of interlocking, disc-shaped components which are connected to one another and are identical or similar to one another.

9. Clarification plant according to claim 8, wherein the components have at least one outer ring channel and inner ring channel and several webs respectively which extend radially between the outer ring channel and the inner ring channel.

10. Clarification plant according to claim 9, wherein the webs open into the outer ring channel and/or the inner ring channel.

11. Clarification plant according to claim 9, wherein the components have at least one axially extending recess outwith the outer ring channel.

12. Clarification plant according to claim 1, wherein the channels, the at least one axially extending recess and the webs are separated from one another by removable or by breakable dividing walls or are connected to one another by removing or breaking through the dividing walls so that only a predetermined selection of channels, recesses and webs interconnect with one another.

13. Clarification plant according to claim 9, wherein the webs have a porous, air-permeable structure.

14. Clarification plant according to claim 9, wherein the components have at least partly in the center of the inner ring channel a duct for receiving a central shaft extending along the stack.

15. Clarification plant according to claim 14, wherein on the central shaft there are attached in one part of the components, agitation elements, worm elements or rotor blades for producing a current which extends from the central shaft outwards into the intermediate space between the inner and the outer ring channel.

* * * * *